United States Patent [19]

Cattaneo et al.

[11] 4,378,197
[45] Mar. 29, 1983

[54] INTER-SHAFT BEARING FOR MULTIBODY TURBOJET ENGINES WITH DAMPING BY A FILM OF OIL

[75] Inventors: Christian J. Cattaneo, Lissy; Jean-Louis Charbonnel, Le Mee sur Seine; Jean-Paul Lagrange, Le Chatelet en Brie; Georges Mazeaud, Yerres, all of France

[73] Assignee: Societe Nationale d'Etude et de Construction De Moteurs d'Aviation, "S.N.E.C.M.A.", Paris, France

[21] Appl. No.: 271,401

[22] Filed: Jun. 8, 1981

[30] Foreign Application Priority Data

Jun. 13, 1980 [FR] France .................. 80 13116

[51] Int. Cl.³ .................................................. F01D 25/18
[52] U.S. Cl. .................................... 415/175; 415/116; 415/119; 184/6.11; 60/39.08
[58] Field of Search ............... 415/112, 116, 119, 175, 415/180; 184/6.11; 60/39.08

[56] References Cited

U.S. PATENT DOCUMENTS

| | | | |
|---|---|---|---|
| 2,620,157 | 12/1952 | Morley et al. | 415/180 X |
| 2,672,278 | 3/1954 | Newcomb | 415/175 X |
| 2,687,096 | 8/1954 | Armacost | 415/175 |
| 2,912,221 | 10/1959 | Chamberlin | 415/180 X |
| 2,919,891 | 1/1960 | Oliver | 415/180 X |
| 2,922,278 | 1/1960 | Szydlowski | 415/180 X |
| 3,034,298 | 5/1962 | White | 415/116 |
| 3,602,605 | 8/1971 | Lee | 415/175 X |
| 3,814,549 | 6/1974 | Cronstedt | 415/119 X |
| 3,826,084 | 7/1974 | Branstrom et al. | 415/175 X |
| 3,903,690 | 9/1975 | Jones | 415/112 X |
| 3,925,979 | 12/1975 | Ziegler | 415/180 X |
| 3,945,758 | 3/1976 | Lee | 415/116 X |
| 4,222,705 | 9/1980 | Smith | 415/180 X |

FOREIGN PATENT DOCUMENTS

| | | | |
|---|---|---|---|
| 137119 | 5/1950 | Australia | 415/180 |
| 2733377 | 2/1978 | Fed. Rep. of Germany | 415/112 |
| 1384980 | 11/1964 | France . | |
| 2001380 | 9/1969 | France . | |
| 2208050 | 6/1974 | France . | |
| 646659 | 10/1962 | Italy | 415/180 |
| 150754 | 7/1955 | Sweden | 415/116 |
| 969579 | 9/1964 | United Kingdom | 415/180 |

*Primary Examiner*—Philip R. Coe
*Assistant Examiner*—Frankie L. Stinson
*Attorney, Agent, or Firm*—Bacon & Thomas

[57] ABSTRACT

A bearing for turbojet engines, placed between a high pressure journal and a low pressure journal is in the form of a roller bearing with rollers, and an inner bushing and an outer bushing, all contained in a box mounted on the low pressure journal. A nut maintains the bushing on the high pressure journal and has an annular recess arranged to receive oil through an inlet dividing it by means of vanes, through axial holes on the bushing, toward the roller bearing for its lubrication and cooling, and through radial holes, by means of the centrifugal effect, to an annular collector formed in the box. The collector has a plurality of stabilizing vanes and its radial height determines the feed pressure, by means of calibrated holes in the box, of a film of oil in an axial space constituted between the bushing and the box, in order to assure therein the damping of vibrations.

5 Claims, 2 Drawing Figures

INTER-SHAFT BEARING FOR MULTIBODY TURBOJET ENGINES WITH DAMPING BY A FILM OF OIL

BACKGROUND OF THE INVENTION

The present invention concerns an inter-shaft bearing for multibody turbojet engines comprising a device for the damping of vibrations by means of a film of oil.

Multibody turbojet engines contain a bearing which supports a first shaft in relation to a second shaft and which comprises in a general manner a roller bearing inserted between an inner bushing mounted on the first shaft and an outer bearing contained in a box, which in turn is mounted on the second shaft. The bearing also contains a lock nut maintaining the inner bushing on the shaft. In a more precise definition, the first shaft consists of the line journal of the shaft of the high pressure body and the second shaft consists of the line journal of the shaft of the low pressure body. At the present time, in order to obtain a satisfactory operation of a bearing of this type, two functions must be performed: on the one hand, the lubrication and cooling of the roller bearing, and on the other, the damping of vibrations normal to the shafts and the roller bearing, must be assured.

French Pat. No. 2,208,050, filed on Nov. 23, 1973, provides an illustration of the solutions applied in the case of a bearing supporting a shaft rotating in relation to a stationary structure, in order to satisfy these operating requirements. Thus, as described by the patent, the lock nut comprises on its internal face and annular groove supplied with oil, which is then distributed over the inner bushing to ensure the lubrication and the cooling of the rollers. After leaving the bearing, the oil arrives on the outer bushing, in a space provided between the outer bushing and the roller box, where the film of oil formed under pressure, acts to damp the vibrations.

Another French Pat. No. 1,384,980, filed on Jan. 8, 1964, envisions the case of an inter-shaft bearing, for which, from a common inlet, oil is distributed on the one hand, over the ball bearing for lubrication, and on the other through an annular chamber toward a plurality of recesses provided in the outer bushing, for cooling. The entirety of the oil is then returned, through a common return conduit, for recycling.

However, these solutions of the prior art are not entirely satisfactory. The interdependence, for example, of the supply under pressure of the damping film of oil and the lubricating conduit of the bearing does not allow the adjustment of the necessary flow rates for each function and makes it difficult to obtain constant damping depending on a predetermined flow rate and pressure of the oil supplying the film formed between the outer bushing and the box of the roller bearing. It should be noted that the quality of the results obtained is particularly important for an application to multibody turbojet engines in view of the high velocities demanded and the severe conditions of utilization.

SUMMARY OF THE INVENTION

The object of the invention is therefore an inter-shaft bearing for multibody turbojet engines, the embodiment whereof permits the satisfactory performance of the functions of lubrication and cooling for the roller bearing on the one hand, and the damping of vibrations by means of an oil film under pressure, on the other, without having the limitations and disadvantages of the known solutions analyzed hereinabove.

The bearing for multibody turbojet engines according to the invention is of the type supporting in rotation a first shaft with respect to a second shaft. The first shaft is the line journal of the shaft of the high pressure body and the second shaft is the line journal of the shaft of the low pressure body. The bearing comprises a roller bearing mechanism inserted between an inner bushing mounted on the first shaft, and an outer bushing contained in a box itself mounted on the second shaft. The bearing further comprises a lock nut maintaining the inner bushing on the shaft, said lock nut having, on its internal face, an annular groove supplied with oil by a centrifugal effect, from an inlet located in the second shaft. Within the bearing, from said groove of the nut, the oil is distributed on the one hand over the internal face of the inner bushing toward the rollers to ensure the lubrication and cooling of the rollers, and on the other, to the outer bushing. A radial clearance is further provided in the bearing, between the outer bushing and the bearing box, said radial clearance constituting a space wherein a film of oil is introduced under pressure to ensure the damping of vibrations produced on the second shaft. Finally, in the bearing the entirety of the oil is returned for recycling, by way of the outside of the bearing box. The bearing is characterized in that:

the groove of the nut, constituting a first chamber, contains means ensuring the accurate distribution of the flows of oil spread on the one hand on the inner bushing, and on the other, over the outer bushing;

the box of the outer bushing comprises an annular collector, constituting a second chamber entrained in rotation by the second shaft and receiving the oil centrifuged from the first chamber constituted by the groove of the nut and entrained in rotation at a different velocity by the first shaft, with said collecyor supplying, with oil under pressure, the film formed in the space provided between the outer bushing and the box and having a radial height determined so as to obtain a satisfactory pressure and flow of oil of the film;

the return of the oil is effected at each end of the box, by an upstream circuit and a downstream circuit including means to ensure the balance of the oil flows and of the pressure in both circuits, so as to maintain the correct centering of the bearing;

the shafts comprise centering means intended to guide them during the mounting of the roller bearing without the radial clearance provided between the outer bushing and the box leading to damaging contact between them.

Advantageously, the means for the accurate distribution of the flows of oil from the groove of the lock nut consist of aprtition vanes placed so as to divide said groove into two series of sectors, the first series of sectors comprising a plurality of radial holes through which the oil supplying by means of centrifuging the annular collector of the bearing box, while the second series of sectors comprises a plurality of axial holes through which the oil is distributed, by way of longitudinal grooves and radial holes of the inner bushing, onto the inner track of the bearing, said radial holes and axial holes of the lock nut being dimensioned so as to provide, with accuracy, the said distribution of the flows of oil.

Advantageously, the annular collector of the bearing box has vanes placed on a lateral face of the collector. so as to stabilize the ring of oil inside the collector and to regulate the supply of the film of oil formed between the bushing and the box; the box further comprises a predetermined number of calibrated longitudinal holes opening into an annular recess, whereby the oil from the collector is distributed, so as to adjust with precision the pressure of the oil of the film.

Advantageously also, the internal means ensuring the balance of the flows and pressures of the oil between the upstream circuit and the downstream circuit of return on either side of the external bushing consist of a flexible joint placed between said bushing and the box at the inlet of the upstream circuit in a manner to create an oil reserve and to generate on the upstream side pressure drops equivalent to those generated on the downstream side by a projection, in order to prevent an imbalance of axial pressures on the outer bushing and to maintain the correct centering of the bearing.

Advantageously, the centering means for the shafts, during installation, consist of grooves cut into a projection of the low pressure journal and grooves cut into an associated zone of the high pressure journal.

BRIEF DESCRIPTION OF THE DRAWINGS

Further characteristics and advantages of the invention will become more apparent from the description hereinafter of an embodiment and by referring to the drawings attached hereto, wherein.

DESCRIPTION OF A PREFERRED EMBODIMENT

Figure 1:
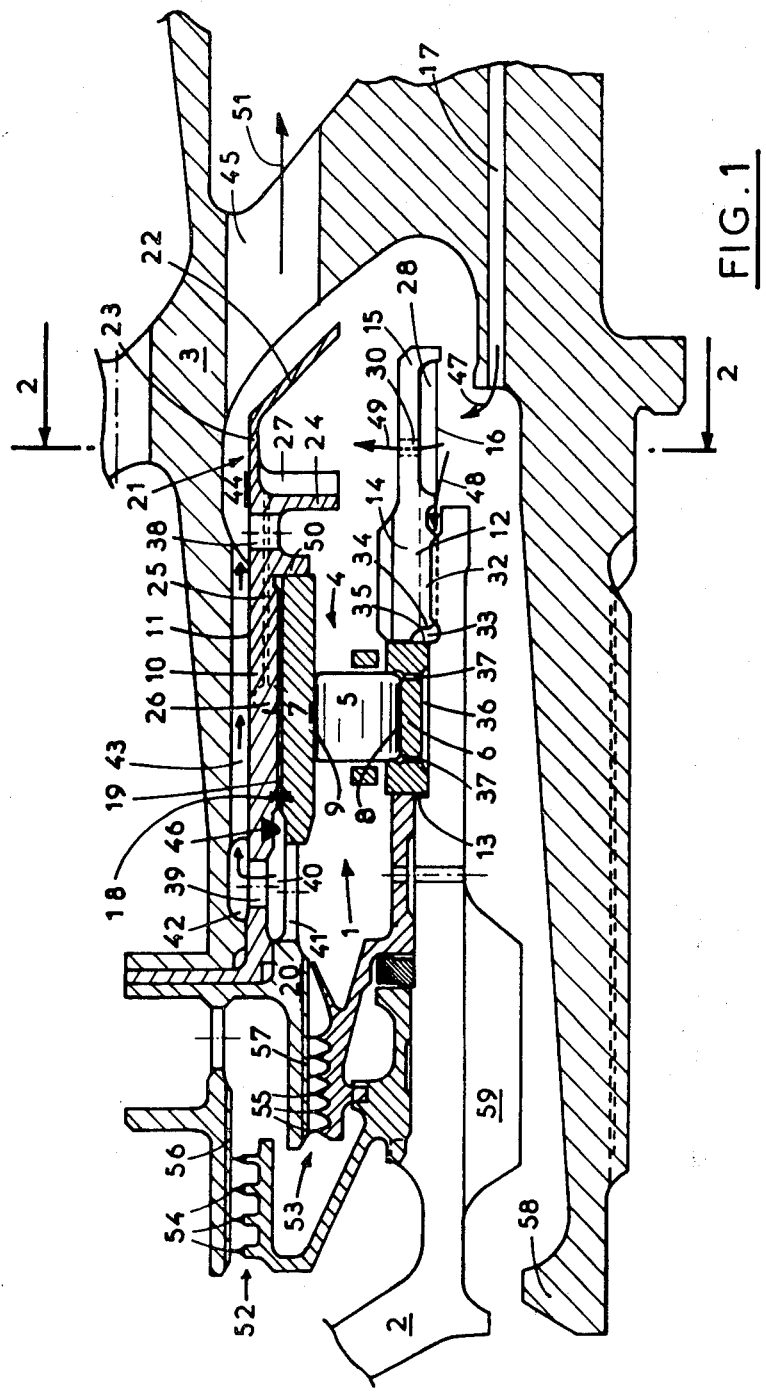
FIG. 1 is a view in an axial cross section of the part of a multibody turbojet engine comprising the inter-shaft bearing according to the invention.

In FIG. 1, a bearing according to the invention is shown, designated in general at 1, of a multibody turbojet engine, placed between a first shaft 2 which is the line journal of the shaft of the high pressure body, and a second shaft 3 which is the line journal of the shaft of the low pressure body. The bearing 1 comprises a roller bearing 4, the rollers 5 whereof are inserted between an inner bushing 6 and an outer bushing 7, while rolling on an internal track 8 and an external track 9. The inner bushing 6 is mounted on the first shaft 2. The outer bushing 7 is contained in a box 10, which in turn is mounted in a bore 11 of the second shaft 3. The inner bushing 6 is fastened to the shaft 2 by means of a lock nut 12, which secures it against a shoulder 13 of the shaft. The lock nut 12 has a part 14 which is mounted by threading on the shaft, and a part 5 which is free of the shaft. The part 15 carries on its inner face an annular recess 16. To the right of the recess 16 in shaft 3, a plurality of longitudinal holes 17 are formed, said holes passing through the part located at this level of the second, low pressure shaft 3. Between the outer bushing 7 and the bearing box 10, a radial clearance 18 is provided; it constitutes an annular space 19. The outer bushing 7 is maintained in the box 10 by means of an anti-rotation retaining ring 20.

In the embodiment shown, the roller box 10 comprises, to the right of the recess 16 of the nut 12, and radially outwardly of said nut, an annular collector 21, which has a lateral face 22 of a truncated configuration located on the opposite side with respect to the bearing and joined by a bottom 23 to a lateral face 24 of a cylindrical shape, located at the adjacent side of the bearing, in keeping with the general geometric definition of the assembly. A plurality of longitudinal holes 25 begins at the face 24 in the vicinity of bottom 23, said holes being drilled in the box 10, opening into an annular recess 26, which in turn opens into the space 19, between the box 10 and the outer bushing 7. On the face 24, there is found in a regular distribution, a plurality of oil retaining vanes 27.

According to the invention, the bearing 1 also comprises means for the distribution of the oil exiting from the recess 16 of the nut 12. These means consist of the partitioning vanes 28; they divide the said recess into two series of sections. The partial view shown in FIG. 2, the cross section on the line 2—2 of FIG. 1, serves to demonstrate this arrangement. A first series of sections, such as 29, have a plurality of radial holes 30, and the second series of sections, such as 31, have a plurality of axial openings 32, opening into an annular cavity 33 provided at the end of the nut 12, on the inner side, between the face 34 of said nut and the face 35 of the inner bushing 6. From this cavity 33, a plurality of longitudinal grooves 36 machined into the inner bushing 6, extend, said grooves communicating with radial holes 37 opening onto the inner track 8 of the bearing.

According to the invention, the bearing 1 further comprises on the bearing box 10, a plurality of radial holes 38 at the end where the annular collector 21 is located, and at the other end is a plurality of holes 39, in communication on the one hand through an annular space 40 provided between the box 10 and the retaining ring 20, with the radial holes 41 of said ring 20, and on the other hand, with an annular cavity 42 provided between the box 10 and the second shaft 3. From the cavity 42, a plurality of longitudinal grooves 43 are machined into the shaft 3 and extend, together with the holes 38, into a space 44 with the passages 45 through the shaft 3 also extending into said space 44. A flexible joint 46 is placed between the outer bushing 7 and the bearing box 10, at the inlet of the annular space 40.

The operation of the bearing according to the invention serves to demonstrate the characteristics made apparent in the above description and to specify the advantages obtained thereby.

The oil arrives through the holes 17 of the second shaft 3, which is the low pressure journal. Due to the centrifugal effect, the oil passes in the direction of the arrow 47 into the annular recess 16 of the nut 12. At this point, the oil is divided into two separate circuits:

on the one hand, according to the arrow 48 and through the axial holes 32 of the nut, a first circuit supplies oil to the cavity 33, the longitudinal grooves 36 and the radial holes 37 of the inner bushing 6, said oil being urged by the centrifugal effect along the faces of the rollers 5, then onto the outer track 9 of the bearing, to the outlets consisting of the radial passages 38 and 41 on either side of the outer bushing, thereby ensuring the lubrication and cooling of the bearing.

As shown by the arrow 49 some of the oil flows into 16 and through the radial holes 30 of the nut, a second circuit, which supplies by means of the centrifugal effect the annular collector 21 of the bearing box 10.

The oil arriving in the annular collector 21 is stabilized by the vanes 27, to be transported under pressure through the longitudinal holes 25 of the box 10, into the space 19 constituted between the outer bushing 7 and the box 10. The film of oil thus formed under pressure in the space 19 ensures the damping of the vibrations normal to the bearing 4 and the shafts 2 and 3.

At each end of the outer bushing 7, the oil carried into the space 19 is mixed with the oil passing through the lubricating and cooling circuit of the bearing, in order to pass into the outlets consisting of the radial holes 38 and 41. On both the upstream and downstream side, this oil circulation experiences pressure drops, caused at one end of the bushing 7 by a projection 50 and at the other end by the flexible joint 46. This arrangement ensures the balance of oil flows and pressures on either side and thus aids in maintaining the correct centering of the outer bushing 7 of the bearing, by preventing an unbalancing of axial pressures on said bushing.

Through the radial holes 41 of the bushing 20, then the radial holes 39 of the box 10 and the longitudinal grooves 43 of the second shaft 3, and through the radial holes 38 of the box 10, the oil arrives in the space 44 and is then conducted for recycling, through the passages 45 of the shaft 3, as shown by the arrow 51.

The division of the oil into two separate circuits ensures first, the lubrication and cooling of the bearing, and second, the damping of vibrations normal to the bearing and the shafts and affords the advantage that the failure of one of the circuits does not result in the failure of the other and for example, that a contamination of the lubricating circuit does not also involve the clogging of the holes supplying the film of oil under pressure for damping.

The uniformity and the precision of the division of the flows of oil between the two circuits established in this manner, are obtained by the placement of partitioning vanes 28 in the recess 16 of the nut 12 and by properly dimensioning of the radial holes 30 and the axial holes 32.

The level of the pressure of the oil of the film formed to dampen vibrations, between the bushing 7 and the box 10 is determined by the radial height given to the annular collector 21. This pressure level may be adjusted experimentally by a simple modification of the box 10, by varying the diameter or the number of the holes 25.

The action of the stabilizing vanes 27 of the annular collector 21 is important. In effect, the present applicant has found during operating experiments of bearings of the type described hereinabove, that oil in contact with rotating air will rotate even in a stationary enclosure. The rotation of the ring of oil with respect to the collector in the present case creates a turbulence opposing the entry of the oil in the supply holes. These perturbations in the normal circulation of the oil lead to the flooding of the bearing, the slipping of the roller elements and thus to the rapid wear of the bushing. The arrangement introduced by the invention eliminates these disadvantages.

It should be noted that by the application of a known device for the damping of vibrations by means of a film of oil under pressure, it is intended to further maximize the effect of the bearing according to the invention. This object has lead to the adoption of two arrangements:

on the one hand, the film of oil is formed in a space established between the outer bearing 7 and the bearing box 10, so that the damping effect is applied to a large diameter, as the effectiveness of this effect increases with the diameter to which it is applied, on the other hand, this effect is also applied to a substantial length of the outer bushing 7 of the bearing 4, thereby further improving the efficiency of damping as a function of an increase in the length to which it is applied.

Figure 2:
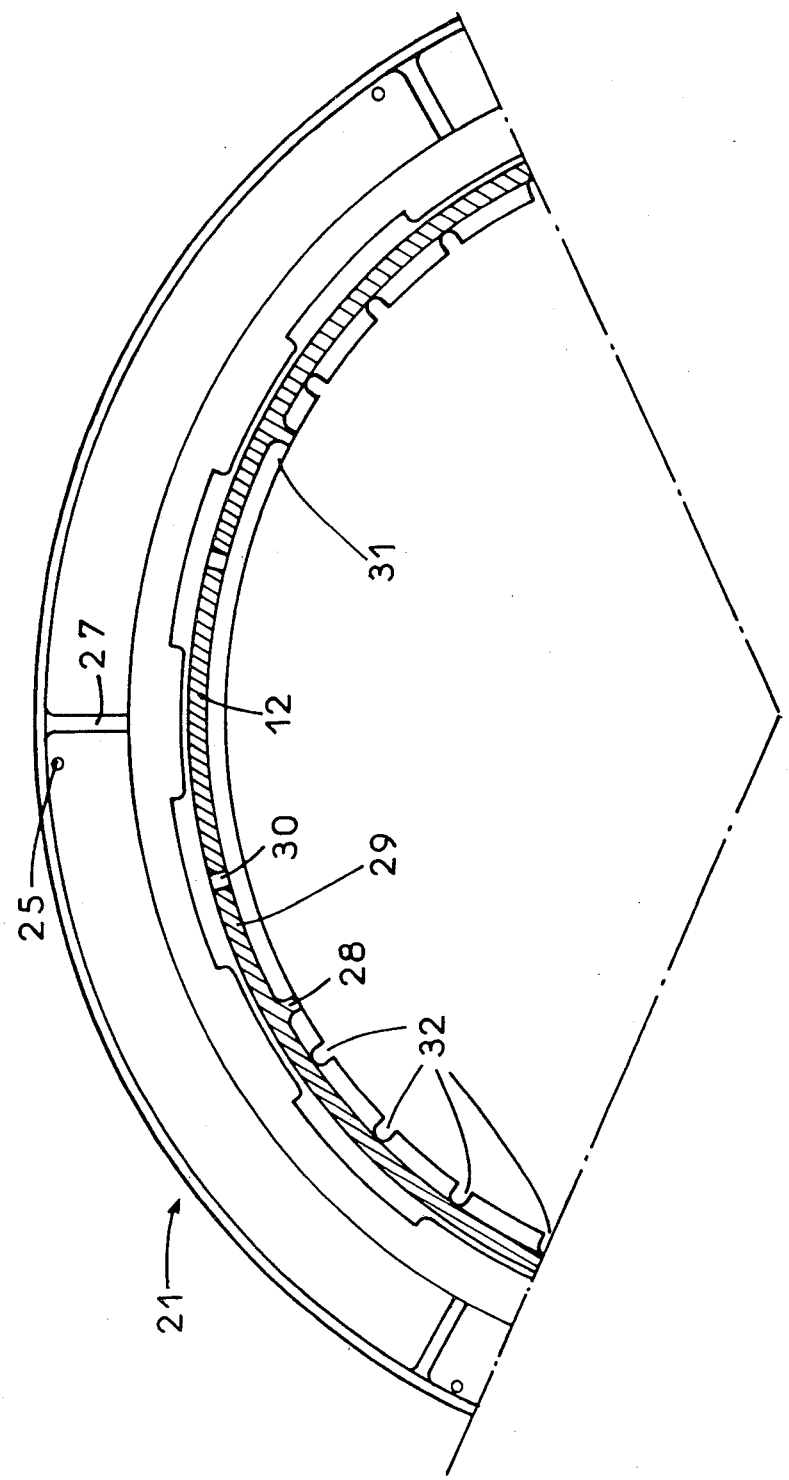
FIG. 2 is a partial view of a cross section on the line 2—2 of the bearing shown in FIG. 1.

The application of the invention as a single embodiment is presented as an explanation and without representing a limitation of any kind, with reference to FIGS. 1 and 2; it leads to the introduction of a supplemental device necessary for the accomplishment under favorable conditions the assembly of the high pressure and the low pressure bodies of the turbojet engine.

In fact, it may be observed in this case that different technical considerations and observation of the operation of the machine lead to the placement on the journals on the one hand of a labyrinth seals, such as 52 and 53 comprising the wipers 54 and 55, and on the other hand, corresponding zones coated with a wear-resistant layer such as 56 and 57. During the installation of the assembly, the presence of the radial clearance 18 may cause a rocking motion of the journal, possibly damaging the wipers 54 or 55, while the rollers 5 are not in place and the wipers 54 or 55 are not engaged at the level of the associated zones 56 and 57.

In order to eliminate these disadvantages, the shafts 2 and 3 of the bearing 1 comprise according to the invention centering means which prevent any harmful contact of the labyrinth seals during installation. These means consist on the one hand on the low pressure journal 3 of a projection 58, wherein a plurality of grooves is cut, and on the other hand, on the high pressure journal 2 of a corresponding zone 59 also carrying a plurality of grooves, facilitating the assembly of the two pieces.

By means of the entirety of these arrangements, the bearing constructed according to the present invention, first ensures an adequate lubrication and cooling of the roller bearing 4, and second, provides a constant damping of the vibrations of the roller bearing 4 and the shafts 2 and 3 by virtue of a film of oil, with the level of pressure and the flow rate of said oil film being adapted to the operating conditions of the bearing, while eliminating various functional problems related to the circulation of oil and providing a solution of the difficulties associated with the assembly of the unit.

We claim:

1. A bearing for multibody turbomachines of the type supporting in rotation a first shaft (2) defining a line journal of a high pressure body in relation to a second shaft (3) defining the line journal of a low pressure body and comprising a roller bearing (4) with rollers (5) inserted between an inside bushing (6) mounted on the first shaft (2) and an outer bushing (7) contained in a box (10), itself mounted on the second shaft (3), and a lock nut (12) maintaining the inner bushing (6) on said first shaft, said nut (12) having on its internal face an annular recess (16), supplied with oil by the centrifugal effect from an inlet (17) located on the second shaft (3), wherein from the recess (16) of the nut (12), oil is distributed on the one hand over the inner track (8) of the roller bearing (4) toward the rollers (5) to ensure the lubrication and cooling of the bearing, and on the other, to the outer bushing (7), wherein a radial clearance (18) provided between the outer bushing (7) and the box (10) of the roller bearing constitutes a space (19), where a film of oil is introduced under pressure, to ensure the damping of vibrations generated on the second shaft (3) and wherein the entirety of the oil distributed is returned for recycling by way of the outside of the box (10) of the roller bearing characterized in that:

the recess (16) of the nut (12) constitutes a first chamber comprising means to assure the accurate division of the flows of oil distributed on the one hand over the inner bushing and on the other, over the outer bushing, the box (10) of the outer bushing (7) comprises an annular collector (21) constituting a second chamber entrained in rotation by the second shaft (3) and receiving the oil centrifuged from the recess (16) of the nut (12), constituting the first chamber, entrained in rotation at a different velocity by the first shaft (2), said collector (21) supplying oil under pressure to the film formed in the space (19) provided between the outer bushing (7) and the box (10) and having a predetermined radial height such as to obtain a satisfactory pressure and oil flow of the film, return of the oil being effected, at each end of the box (10) of the roller bearing, by means of an upstream circuit (42) and a downstream circuit (44), comprising internal means to ensure the balancing of the flows and pressures of the oil in both circuits, in a manner so as to maintain the correct centering of the bearing, the shafts (2) and (3) including centering means to guide the shafts (2) and (3), during installation, within each other, without the radial clearance (18) provided between the outer bushing (7) and the box (10) leading to harmful contact between the shafts.

2. An inter-shaft bearing for multibody turbojet engines according to claim 1, wherein the means for the accurate division of the flows of oil distributed from the recess (16) of the nut (12) consist of partitioning vanes (28), placed so as to divide the said recess (16) of the nut (12) into two series of sections (29, 31), with the first series of sections (29) having a plurality of radial holes (30), through which the oil is caused to flow by means of centrifugation the annular collector (21) of the roller bearing box (10) and a second series of sections (31) having a plurality of axial holes (32) whereby oil is distributed through longitudinal grooves (36) and radial goles (37) of the inner bushing (6) over the inner track (8) of the roller bearing (4), said radial holes (30) and axial holes (32) of the nut (12) being dimensioned so as to adjust with precision the said division of the flows of oil.

3. An inter-shaft bearing for multibody turbojet engines according to one of claims 1 or 2, characterized in that the annular collector (21) of the box (10) of the outer bushing (7) of the roller bearing (4) has a plurality of vanes (27), placed on a lateral face (24) of the collector (21) in order to stabilize the ring of oil inside the collector and to regularize the supply of oil to the oil film constituted between the bushing (7) and the box (10), and in that the box (10) has a definite number of calibrated longitudinal holes (25), whereby the oil is distributed from the collector (21), so as to adjust with precision the oil pressure of the film.

4. An inter-shaft bearing for multibody turbojet engines according to one of claims 1 or 2 wherein the internal means assuring the balancing of the flows and pressures of oil between the upstream and downstream return circuits on either side of the bushing (7) consist of a flexible joint (46) placed between the bushing (7) and the box (10) at the inlet of the upstream circuit, thereby creating an oil reserve and causing on the upstream side pressure drops equivalent to those generated on the downstream side by a projection (50), for the purpose of preventing an imbalance of the axial pressures on the bushing (7) and to maintain the correct centering of the roller bearing (4).

5. An inter-shaft bearing for multibody turbojet engines according to claim 1 wherein the centering means for the shafts (2) and (3) consist of grooves cut into a projection (58) on the low pressure journal (3) and of grooves cut into an associated zone (59) of the high pressure journal (2).

* * * * *